United States Patent [19]

Richt

[11] 3,972,072
[45] July 27, 1976

[54] DEVICE FOR INTRODUCING AND EJECTING A MAGNETIC TAPE CASSETTE FOR A MAGNETIC TAPE RECORDER

[75] Inventor: Oskar Hubert Richt, Socking, Germany

[73] Assignee: Uher Werke München, Munich, Germany

[22] Filed: May 8, 1974

[21] Appl. No.: 468,082

[30] Foreign Application Priority Data
May 8, 1973 Germany............................ 2323171

[52] U.S. Cl............................... 360/93; 242/199
[51] Int. Cl.².................. G11B 23/06; G11B 15/24
[58] Field of Search........................... 360/96, 93; 242/197–200

[56] References Cited
UNITED STATES PATENTS

| | | | |
|---|---|---|---|
| 3,614,109 | 10/1971 | Yamamoto et al. | 360/93 |
| 3,638,953 | 2/1972 | Kodama et al. | 360/96 |
| 3,656,704 | 4/1972 | Ogura | 360/96 |
| 3,669,455 | 6/1972 | Cicatelli | 360/93 |
| 3,669,456 | 6/1972 | Oteki | 360/93 |
| 3,669,457 | 6/1972 | Nozawa et al. | 360/93 |
| 3,759,530 | 9/1973 | Sampei | 360/93 |
| 3,810,242 | 5/1974 | Ikeda | 360/96 |

*Primary Examiner*—Alfred H. Eddleman
*Attorney, Agent, or Firm*—Fleit & Jacobson

[57] ABSTRACT

A device for introducing and ejecting a cassette in a cassette tape recorder, in which a cassette with its narrow side is pushed into a slot on the front of the cassette tape recorder, whereby a dead center spring is tensioned, which after passing the dead center causes the cassette to be pulled into a cassette lift, subsequently to which the cassette lift and the cassette are placed on the drive mechanism vertically with the slide-in motion by means of an operating element and that the cassette lift can be moved away from the drive mechanism by displacing the operating element in the opposite direction, said element being one and the same, and that connecting elements are provided between the operating element and the dead center spring, which displace the dead center of the spring in such a manner that the cassette is ejected. Thus the cassette lift merely requires one operating element for the introducing and ejecting of the cassette.

9 Claims, 1 Drawing Figure

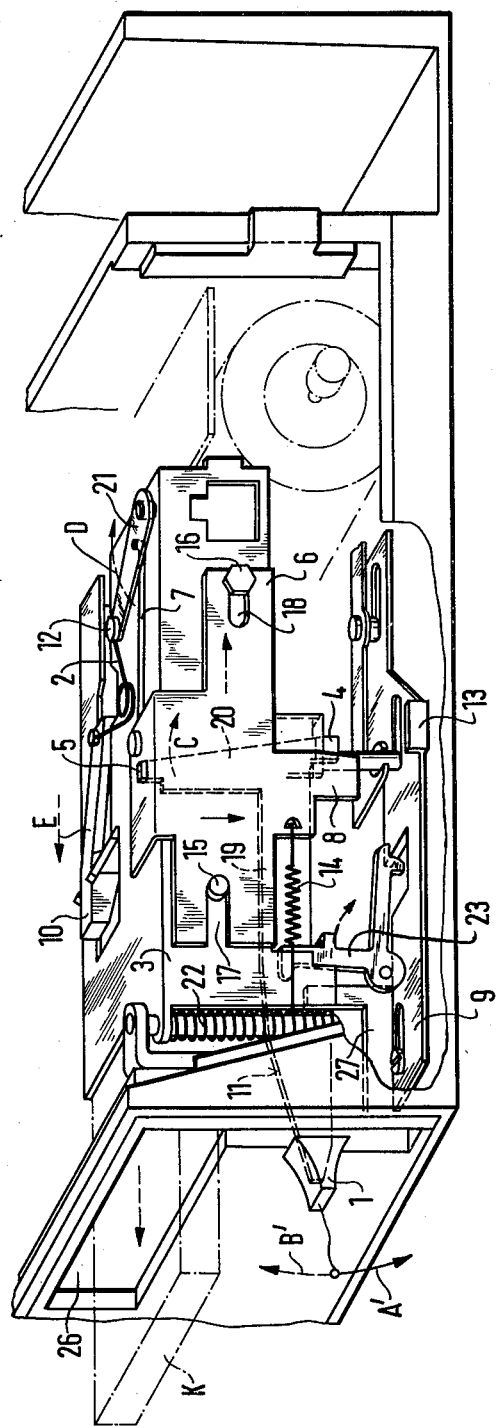

DEVICE FOR INTRODUCING AND EJECTING A MAGNETIC TAPE CASSETTE FOR A MAGNETIC TAPE RECORDER

The invention refers to a device for introducing and ejecting a magnetic tape cassette, in which a cassette is pushed into a slot on the front of a cassette tape recorder with its narrow side, whereby a dead center spring is tensioned, which after passing the dead center, pulls in the cassette, subsequent to which the cassette is placed on the drive mechanism by means of an operating element vertically with the slide-in motion.

With tape recorders and cassette recorders it is known per se that the cassettes are placed on the drive mechanism of the machine by a swivel motion from above. If it is intended, however, to achieve a low height of construction of the cassette recorder and particularly also with cassette tape recorders for motor vehicles, it is desirable to insert the cassette through a slot in the front of the cassette recorder and to place it on the drive mechanism. Both when introducing and ejecting the cassette, the cassette has to be moved in two directions, i.e. in a horizontal and vertical direction. With the machines as known, this naturally results in a comparatively great design effort.

It would then be conceivable to provide in each case separate controls on the cassette recorder for each direction of the motion which the cassette describes in each case during its introduction and ejection. This would, however, greatly complicate the operation of the machine and there would be the danger of persons not familiar with the exact operation of the cassette, damaging the mechanism for introducing and ejecting the cassette by improperly operating the controls.

The object of the invention is therefore to demonstrate a device of the kind stated initially which can be operated simply and which also only requires few constructional auxiliary means for providing the corresponding directions of motion when introducing and ejecting the cassette.

The object is achieved in accordance with the invention by means of the device represented initially, in that the cassette lift can be moved away from the drive mechanism by displacing the control element in the opposite direction and that connecting elements are provided between the operating element and the dead center spring which displace the dead center of the spring in such a manner that the cassette is ejected. By means of the invention it is rendered possible that only one control element is provided which serves for the ejection and introduction of the cassette.

In order to be able to transfer the motion of the control element directed towards the drive mechanism of the cassette on to the cassette lift, one or several guide pins can be provided on the cassette lift which retain the operating element in a stop position against the pretension of a spring. In order to achieve the reversal of the direction of force of the dead center spring, the operating element can be made tiltable against or in the direction of the pretension of the spring.

In order to be able to transfer the swivel motion of the operating element on to the dead center spring, a slider can be provided on the cassette lift which can be driven by the tilting of the operating element which furthermore acts on the point of suspension of the dead center spring. For this purpose the slider can have longitudinal slots, into which the guide pins, provided on the lift, engage which retain the operating element in the stop position.

The operating element is advantageously designed as a bent lever, whose hinge point on the cassette lift is located within the area of the connection of the two lever arms, the free end of one arm being provided with an operating knob or the like and the free end of the other arm acting on the slider. The free ends of the two arms can be formed in the way of lugs which are inserted in the openings of the cassette lift and the slider. The slide can moreover act on a pivoted lever via a linkage on which the point of suspension of the dead center spring is located.

In order to retain the cassette lift in a position, in which the cassette is retained while set down on the drive mechanism, a detent is provided by means of which the cassette lift is retained against the pre-tension of a spring. This detent can be disconnectable upon the tilting of the operating element, whereby the cassette lift and the cassette contained therein permit themselves to be lifted off the driving mechanism of the magnetic tape machine due to the spring force. For the release of the detent a further slider can be provided which abuts with the first slider attached to the cassette lift by means of a stop when the cassette lift is locked. With the displacement of the first slider due to the tilting of the operating element, the second slider is also displaced in such a manner that the detent is released.

The invention provides the advantage that by means of a single operating element, a cassette can be introduced and ejected into and from the cassette tape recorder. This single operating member serves both for reversing the direction of force of the dead center spring and reversing the direction of motion of the cassette lift. Moreover the dimensions of the device do not greatly exceed the dimensions of the cassette — particularly in respect of the width and length, thus ensuring a compact layout. By referring to the enclosed drawings, the invention shall be explained in greater detail.

The FIGURE shows an example of an embodiment of the device in accordance with the invention for introducing into and ejecting a cassette from a cassette tape recorder.

The device in the FIGURE has a single operating element 11, provided with an operating knob 1 which projects beyond the casing of the magnetic tape recorder. By displacing the operating knob 1 and thus the operating element 11 in the directions of the arrow A' and B' as indicated, the introduction and the ejection of the cassette K can be accomplished. The operating element 11 is designed as a bent lever and has lever arms 19 and 20. The operating element 11 is inserted by means of a lug 4 in an opening or recess of a cassette lift 3 and hinged on to the cassette lift 3. The one free end of the lever arm 19 of the operating element 11 is provided with the operating knob 1. The free end of the other lever arm 20 is also formed in the shape of a lug 5 and is inserted in an opening of a slider 6 which is displaceably arranged at the cassette lift 3 by means of guide pins 15 and 16. The guide pins 15 and 16 then project into longitudinal slots 17 and 18 of the slider 6. The slider 6 is subjected to the pretension of a spring 14. By this means the operating element 11 is retained in the limit position.

Based on this stop position, the operating element 11 as well as the cassette lift can be brought downwards in the lowest position by a downward movement of the operating knob 1, so that the cassette K is set down on to the drive mechanism. This displacement of the cassette lift 3 in a downward direction takes place against the force of the spring 22. The cassette lift is locked in this lower position and retained by means of the detent lever 23.

If the operating knob 1 is displaced upwards in the direction of the arrow B', the operating element 11 is tilted in addition, so that the lever arm 20 describes a swivel motion in the direction of arrow C, which is transferred on to the slider 6 via the lug 5. By this means the slider 6 is displaced towards the right, causing a lug 8 at the slider 6 to abut with a stop 13 at a further slider 9 and to displace this slider to the right, whereby the detent lever 23 is released from its detent position, thus releasing the cassette lift 3 and moving it upwardly due to the force of the spring 22. The detent lever 23 is at the same time released from the detent position by means of an elbow 27 fixed to the slider 9.

Through the tilting of the operating element 11 in the direction of the arrow B', the displacing motion transferred on to the slider 6 is additionally transferred on to a swivel lever 21 via a linkage 7. The point of suspension for a dead center spring 2 is provided on this swivel lever 21. Due to the displacement of the slider 6, the swivel lever 21 is tilted in the direction of the arrow D, so that the point of suspension 12 of the dead center spring 2 is also tilted to the right. The dead center spring then functions in such a manner that it presses the claw 10 in the direction of the arrow E, causing the cassette K to be ejected through an opening 26 in the casing of the magnetic tape recorder. When returning the dead center spring 2 to the position illustrated in the FIGURE, the direction of force of the dead center spring 2 is such that the claw 10 is pressed to the right against the direction of the arrow E. If therefore a cassette K is introduced through the opening 26, it is gripped by the claw 10 and drawn to the right into the cassette lift 3. By a downward pressure on the operating element 11 by means of the operating knob 1, the cassette K is then set down on the drive mechanism of the magnetic tape recorder.

I claim:

1. A cassette introduction and ejection device for a tape recorder comprising, in combination, a cassette mounting lift arranged for pivotal movement between an upper inoperative position and a lower operative position, means for yieldingly urging said lift into said upper position, releasable locking means for locking said lift in said operative position, cassette gripping means slidably mounted on said lift, a dead center spring connected at one end to said cassette gripping means, linkage means operatively connected between said lift and the other end of said dead center spring, an operating element pivotally mounted on said lift in operative association with said linkage means, stop means on said lift, means for yieldingly urging said linkage means into a first position against said stop means to position said operating element in an intermediate position and to condition said dead center spring for movement of said gripping means in one direction to carry an inserted cassette into a fully inserted position in said lift, said operating element being pivotally movable downwardly from said intermediate position to move said lift into said lower operative position and to permit locking engagement between said locking means and said lift, said operating element being pivotally movable upwardly from said intermediate position to release said lift locking means for movement of said lift into said upper inoperative position by said urging means and to move said linkage means into a second position to condition said dead center spring for movement of said cassette gripping means in the opposite direction to reject said inserted cassette from said lift.

2. A cassette introduction and ejection device in accordance with claim 1 wherein said linkage means comprises a slide member arranged for a horizontal sliding movement on said lift, and means for interconnecting said slide member with the other end of said dead center spring, and wherein said operating element is operatively connected to said slide member.

3. A cassette introduction and ejection device in accordance with claim 2 wherein said stop means includes at least one guide pin on said lift, said guide pin being engageable with said slide member in the first position of said linkage means.

4. A cassette introduction and ejection device in accordance with claim 3 wherein said slide member is provided with at least one longitudinal slot for receiving said guide pin in sliding relationship therewith for guiding the movement of said slide member between said first and second positions of said linkage means.

5. A cassette introduction and ejection device in accordance with claim 2, wherein said operating element is of substantially L-shaped configuration including a substantially vertically extending arm and a substantially horizontally extending arm, said operating element being pivotally mounted on said lift at a pivot point adjacent the intersection of said arms and wherein the free end of said vertically extending arm is operatively connected to said slide member and including an operating knob provided on the free end of said horizontally extending arm.

6. A cassette introduction and ejection device in accordance with claim 5 including a recess on said cassette lift and a recess on said slide member, said free end of said vertically extending arm being received in said slide member recess and wherein said operating element is provided with a lug adjacent said pivot point received within said cassette lift recess.

7. A cassette introduction and ejection device in accordance with claim 2 wherein said linkage means include a lever arm pivotally mounted on said lift and wherein said dead center spring other end is pivotally connected to said lever arm.

8. A cassette introduction and ejection device in accordance with claim 1 wherein said releasable locking means include a pivotally mounted detent member having a locking portion, said detent member being pivotally movable into a locking position for engagement of said locking portion with said lift in said operative position and means actuated by said linkage means for pivotally moving said detent member out of said locking position during the movement of said linkage means into said second position.

9. A cassette introduction and ejection device for a tape recorder in accordance with claim 8 wherein said means for releasing said locking means include a slidably movable slider having a first portion for engagement by said slide member in the operative position of said lift and a second portion engageable with said detent member whereby said slider is moved by said slide member in one direction and said detent member is pivotally moved by said slider second portion out of said locking position during the movement of said linkage means into said second position.

\* \* \* \* \*